United States Patent
Foote

[11] 3,888,435
[45] June 10, 1975

[54] HELICOPTER WITH AUXILIARY LOAD-SUPPORTING AND LIFTING CAPACITY

[76] Inventor: Kenneth R. Foote, 14607 S.E. Madison St., Portland, Oreg. 97233

[22] Filed: July 18, 1974

[21] Appl. No.: 489,474

[52] U.S. Cl. .............................. 244/58; 244/137 R
[51] Int. Cl. ........................................... B64d 41/00
[58] Field of Search.... 244/137 R, 58, 17.11, 17.21, 244/17.17, 6, 7 R, 7 A, 7 C, 53 R, 54, 55, 56, 12 R, 23 R; 74/661

[56] References Cited
UNITED STATES PATENTS
3,447,762   6/1969   Rock .............................. 244/17.17
3,455,182   7/1969   Kelley ............................ 244/58 X Primary Examiner—Trygve M. Blix
Assistant Examiner—Paul E. Sauberer

[57] ABSTRACT

A system is disclosed for lifting and conveying an internal or external load by helicopter where the load to be lifted exceeds the rated lift capacity of the helicopter, the system including one or more lifting thrusters mounted on each side of the helicopter at its center of gravity. The thrusters may include means for providing a horizontal as well as a vertical thrust vector or any combination of the two. The thrusters provide additional lift capacity to the helicopter so that the rotatable system of the helicopter and the fuselage are not loaded over the certified gross weight capacity. Forward velocity of the helicopter may be increased by the horizontal thrust vector of the thrusters.

9 Claims, 3 Drawing Figures

PATENTED JUN 10 1975 3,888,435

SHEET 1

HELICOPTER WITH AUXILIARY LOAD-SUPPORTING AND LIFTING CAPACITY

BACKGROUND OF THE INVENTION

1. Field of the Invention

This invention relates to helicopters for lifting internal or external loads and, more particularly, to such helicopters having mounted thereon auxiliary thrusters.

2. Description of the Prior Art

It has been heretofore well known in the prior art to utilize helicopters for lifting and conveying heavy loads. An example of such a system used as an aerial logging system is illustrated in U.S. Pat. No. 3,447,762, issued to W. H. Rock. A further example of such a system is found in U.S. Pat. No. 2,707,008, issued to C. E. Bannister.

A serious disadvantage of such prior art devices is that the need to carry heavy loads demands that the helicopters be capable of exerting great lifting forces. This requires a helicopter that is very large and thus expensive to purchase and operate.

Another problem with such prior art devices is that the speed at which loads can be transported is relatively slow since helicopters are comparatively slow devices.

SUMMARY OF THE INVENTION

It is an object of this invention to produce a system capable of greater lift capacity than a conventional helicopter alone, the system, considering its overall lift capacity, being relatively inexpensive to operate and much less costly to purchase.

It is another object of this invention to provide a helicopter which is capable of transporting a load either internally or externally at a much faster speed than by use of a helicopter alone.

It is a further object of the present invention to provide a helicopter with auxiliary thrust means which are light and compact and wherein the load to be transported is supported with minimum forces transmitted to the helicopter frame. The lifting force provided by the thrusters is adjusted to prevent excessive load forces from being transmitted to the helicopter frame.

According to the present invention, helicopter helioptor incapable of lifting loads over its certified capacity is provided with one or more auxiliary thrusters. The thrusters may be removably mounted on each side of the helicopter or internally at the helicopter's center of gravity so that the thrust vector goes directly through the center of gravity of the helicopter and does not generate any rotational forces.

The lifting force exerted by the thruster units may be varied as a function of the weight of the load. The powered rotor blades on the helicopter are not used for lifting the extra load since they exert a force no greater than the certified rated lift capacity of the helicopter. By providing additional lift capacity with the use of the thruster units, it enables the use of a smaller helicopter in place of a larger helicopter with additional lift capacity so that the expense of transporting and lifting loads exceeding the rated lift capacity of the helicopter alone is considerably reduced.

The thruster units are spring-mounted on each side of the helicopter and means are provided to produce a signal indicative of a condition where the weight of the load exceeds the rated lift capacity of the thruster units plus helicopter.

The present invention also allows the thruster units to be rotated or the thrust deflected by deflector vanes from a purely vertical position to generate a horizontal as well as a vertical thrust vector or combination of both. In this way the transport speed of the helicopter may be increased over what would normally be provided by the helicopter. When the deflector vanes are used, the thruster units may be mounted in fixed position.

DESCRIPTION OF THE PREFERRED EMBODIMENT

Figure 1:
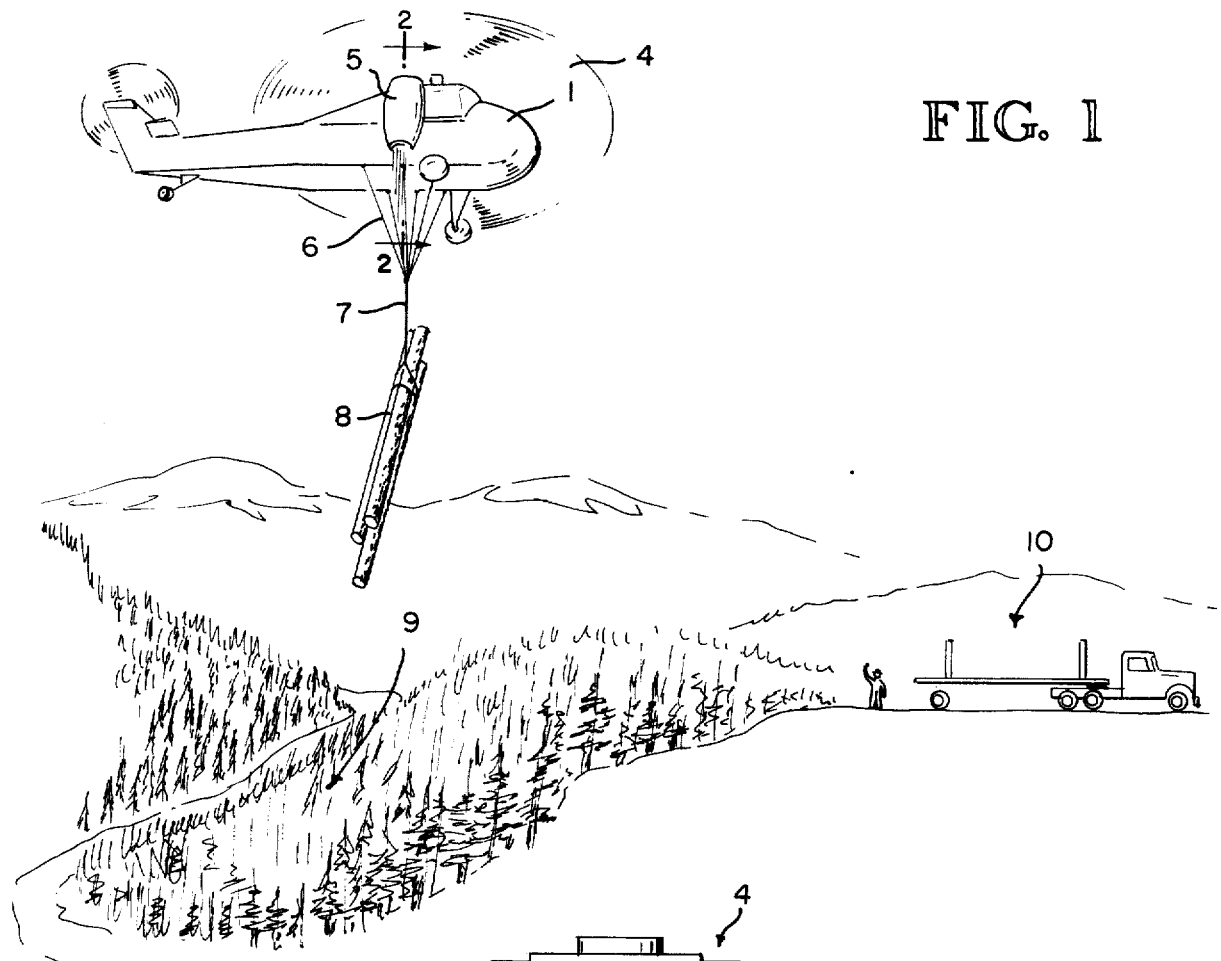
FIG. 1 is an environmental view illustrating the helicopter transport system of the present invention.

Referring to FIG. 1, a conventional helicopter 1 having powered rotor blades 4 has secured thereto on each side thrusters 5, shown here as gas turbines. Although any type of thrust unit may used, a Lycoming F102 Turbofan engine is suitable for use in the present invention. Suitable helicopters for use may include the Sikorsky S-55, S-58, S-61 or S-64, Bell 205, 212 or 214, Boeing 107 or other similar types. Although I have shown the use of two thrusters, it is contemplated that one, two or more thruster units may be utilized and the mounting means will be adapted or modified as the number of thrusters is increased or decreased.

For lifting and transporting external loads, support lines 6 are extended from the underside of the helicopter 1 and are connected to a cargo with a cable or cables 7 which are connected to choker cables secured to the load 8.

In a logging operation, for example, the helicopter, with the thrusters idling, flies over the loading area or area being logged 9 to the point where the load 8 is to be picked up. The helicopter 1 descends close to the ground where cables have been placed around the load 8. The choker cables are secured to the main support cable. The rotor is activated sufficiently to raise the helicopter and tension the cables. The thrusters 5 are then activated in conjunction with the normal lift provided by the powered rotor blades of the helicopter, and the lifting force provided raises the load 8 above the ground a distance as may be required to transport the load completely clear of the ground. The thrusters 5 may then, if desired, be rotated slightly to provide a horizontal thrust vector or the thrust deflected by suitable thrust deflector vanes to provide a combination of vertical and horizontal thrust. The helicopter 1 transports the load from the loading area 9 to the landing or unloading area 10. When the helicopter is above the unloading area 10, the thrusters are either rotated back to their vertical position or the deflector vanes adjusted to provide vertical lift forces, and the lifting forces are reduced so that the helicopter descends slowly toward the ground. When the load 8 engages the ground, the helicopter descends to provide slack in the cables which are then disengaged from the cargo hook by action of the operator of the helicopter or by remote control.

FIG. 1 illustrates use of the helicopter in aerial logging; however, it can also be used advantageously in any other application where loads are to be lifted and transported, either internally or externally.

To prevent structural failure of the helicopter frame when lifting loads exceeding the certified lift capacity of the helicopter, it is necessary to provide structural means between the portion of the helicopter frame and the mounting means for the thruster units to transfer the weight of the load to the thruster mounting means.

Figure 2:
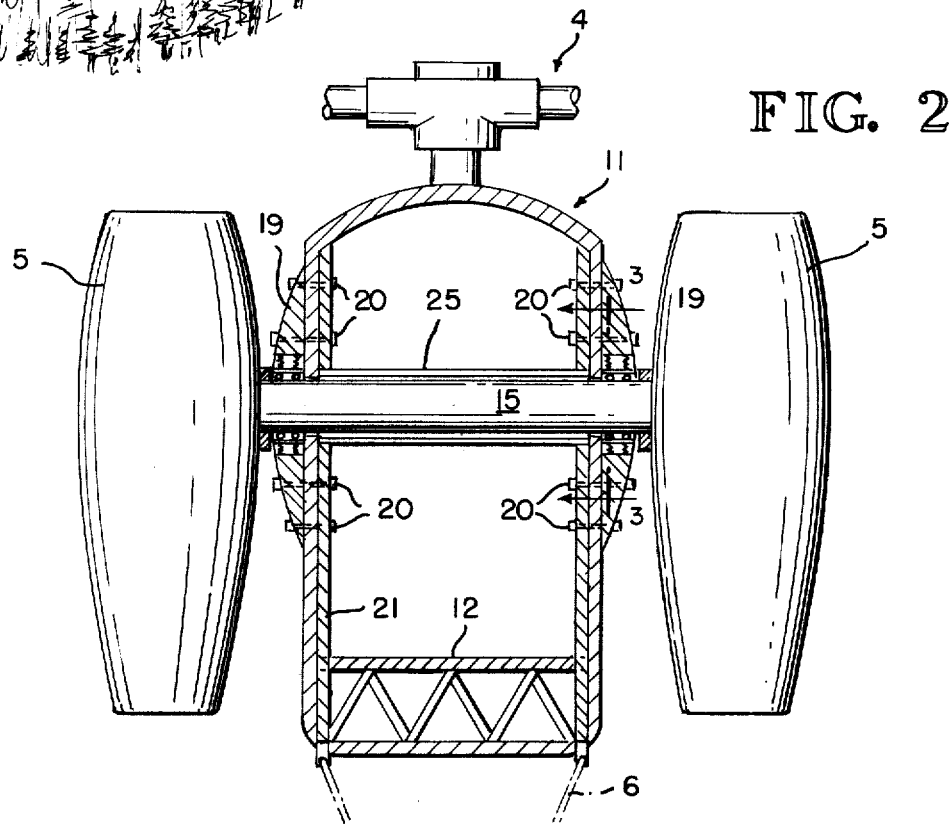
FIG. 2 is a cross-sectional view taken along line 2—2 in FIG. 1.

FIG. 2, which is a cross-sectional view taken along line 2—2 of FIG. 1 illustrates the thruster support mechanism. Mounting plates 19 are secured to the outside of the fuselage 11 by bolts 20 passing through the fuselage 11 and fixed to the lifting frame 21. The mounting plates may be secured to the inside of the fuselage if desired, depending on the configuration of the helicopter. The lifting frame 21 is also secured to the floor 12 of the helicopter if the load is to be carried internally of the helicopter. For external loading, the load is attached to the lifting frame 21 through support lines 6 fastened to the lower ends of the lifting frame 21 at the hard points. The mounting plates and thrusters 19 are designed to be easily removed to allow conventional operation of the helicopter 1. In this regard, quick-disconnect fuel and electrical lines are provided to the thrusters from the helicopter.

The mounting plates 19 contain a housing 25 which extends between the mounting plates and through which shaft 15 extends. The mounting plates 19 are positioned so that the housing is located at the center of gravity of the helicopter; therefore, any forces exerted by the shaft 15 extending through the housing do not form a rotational moment.

Figure 3:
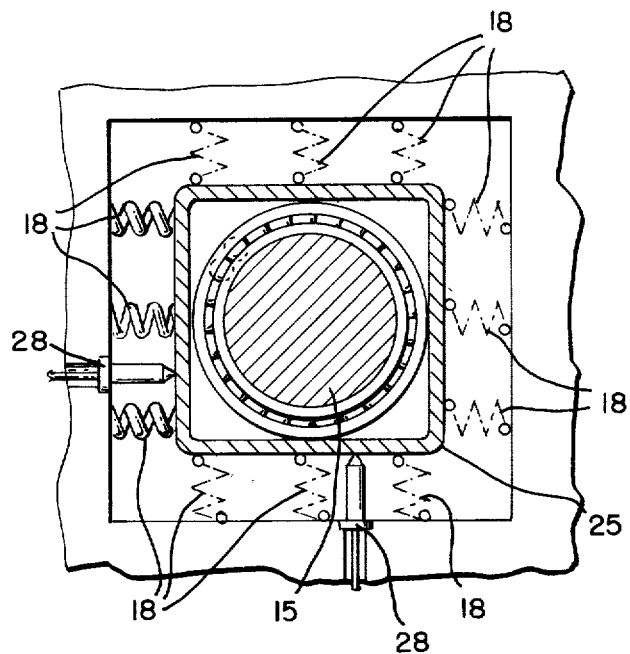
FIG. 3 is a cross-sectional view taken along line 3—3 of FIG. 2.

Referring to FIG. 3, bearings are contained in the housing and surround the shaft. The housing is resiliently supported by the mounting plates 19 through springs 18. The shaft 15 is rotatably supported by the bearings. Means may be provided (not shown) for rotating shaft 15 to cause the thrusters 5 to generate a variable horizontal thrust vector. Rather than make the thrusters rotatable, suitable thrust deflector vanes may be provided for each thruster for adjustment of the thrust vector vertically or horizontally or any combination thereof. In this way, the speed of the helicopter can be controlled by adjusting the amount of force produced by the thrusters and either the amount of rotation of shaft 15 or the amount of thrust deflected by the thrust deflector vanes.

A positional transducer 28 is secured to the mounting plates 19 and adapted to produce a signal indicative of the load between the housing 25 and the mounting plates 19. Since the housing 25 is spring-mounted, the distance between the housing and the mounting plates is a measure of the force between the housing and the mounting plates. Therefore the signal generated by transducer 28 is an indication of the weight of the load 8 carried by the thrusters 5. Since the maximum available lifting force of the helicopter is known, a measurement of the weight of the load allows the pilot to maintain a safety factor when using the thrusters. If desired, an additional positional transducer may be secured for generating a signal indicative of the force between the housing 25 and the mounting plates 19 to measure the forward thrust generated by the thrusters.

The frame 11 of the helicopter need not be strengthened fof lifting and transporting loads 8 exceeding the certified lift capacity of the helicopter as the thrusters 5, which generate auxiliary lifting forces, are secured directly to the load 8 for external loading or to the floor supports 12 of the helicopter through mounting plates 19 and lifting frame 21 for internal loading.

For safety reasons, sensing means are provided for sensing when one or both of the thrust units is operating improperly. In the event the sensing means indicates an improper or dangerous condition, control means are provided to automatically jettison the load carried by the helicopter and shut down the thruster units simultaneously to prevent damage to the helicopter and loss of flight control.

The auxiliary lifting capacity provided as described provides more than double the lift capacity of a particular helicopter. For example, the Sikorksy S-58 helicopter is capable of lifting about 6,000 pounds by means of the powered rotor blades alone. A pair of thruster units mounted as shown, such as the Lycoming thruster units referred to previously, provides 10,000 pounds of additional lift capacity, thereby making the overall lift capacity of the helicopter equal about 16,000 pounds. This is accomplished without extensive alteration of the helicopter.

While the preferred form of the invention has been shown and described, it should be understood that changes in the details will be readily apparent to those skilled in the art. Accordingly, the invention is not to be limited to the embodiments disclosed but is to be determined solely by the scope and proper interpretation of the claims appendant hereto.

The embodiments of the invention in which a particular property or privilege is claimed are defined as follows:

1. A system for lifting and conveying loads whose weight exceeds the certified lift capacity of the powered rotor blades of a helicopter, comprising:
    a helicopter having a frame and powered rotor blades providing vertical lift and means for transverse movement thereof,
    load support means for securing a load,
    mounting means at the center of gravity of the helicopter,
    one or more thruster units secured to the mounting means providing sufficient additional vertical lift capacity over the vertical lift capacity of the helicopter to lift the secured load, and
    structural means extending between the mounting means, frame of the helicopter and load support means adapted to transfer the weight of the load exceeding the certified lift capacity of the helicopter to the mounting means and preventing greater than normal stress being exerted on the frame of the helicopter when lifting loads with a weight greater than the certified lift capacity of the helicopter.

2. The system of claim 1 wherein the thruster units are two gas turbine engines mounted on each side of the frame of the helicopter at the center of gravity thereof directly opposite one another.

3. The system of claim 2 wherein the thruster units are removably secured to the mounting means.

4. The system of claim 2 wherein the thruster units are rotatably secured to the mounting means for providing vertical or horizontal thrust or any combination thereof.

5. The system of claim 2 wherein the thruster units are mounted in a fixed position and include adjustable thrust deflector vanes in the path of thrust for providing vertical or horizontal thrust or any combination thereof.

6. The system of claim 2 wherein the mounting means includes (1) a shaft extending through the frame of the helicopter at the center of gravity thereof and transverse to the length dimension, and (2) a housing surrounding the shaft.

7. The system of claim 6 wherein the shaft is adapted to rotate within the housing.

8. The system of claim 6 wherein the housing is spring-mounted relative to the frame of the helicopter and includes sensing means sensing the load imposed on the shaft for notifying the operator of the helicopter when the certified lift capacity of the helicopter and thruster units is exceeded.

9. The system of claim 1 wherein the structural means includes bulkheads secured to and surrounding the mounting means and extending to and secured to the portion of the frame of the helicopter from which the load is supported.

* * * * *